(12) United States Patent
Rajati et al.

(10) Patent No.: US 10,354,191 B2
(45) Date of Patent: Jul. 16, 2019

(54) LINGUISTIC GOAL ORIENTED DECISION MAKING

(71) Applicants: Chevron U.S.A. Inc., San Ramon, CA (US); University of Southern California, Los Angeles, CA (US)

(72) Inventors: Mohammad Reza Rajati, Los Angeles, CA (US); Jerry M. Mendel, Los Angeles, CA (US); Andrei Popa, Bakersfield, CA (US); Lisa A. Brenskelle, Houston, TX (US)

(73) Assignees: University of Southern California, Los Angeles, CA (US); Chevron U.S.A. Inc., San Ramon, CA (US)

( * ) Notice: Subject to any disclaimer, the term of this patent is extended or adjusted under 35 U.S.C. 154(b) by 916 days.

(21) Appl. No.: 14/851,643

(22) Filed: Sep. 11, 2015

(65) Prior Publication Data

US 2016/0078345 A1   Mar. 17, 2016

Related U.S. Application Data

(60) Provisional application No. 62/050,046, filed on Sep. 12, 2014.

(51) Int. Cl.
*G06F 15/18* (2006.01)
*G06N 5/04* (2006.01)

(52) U.S. Cl.
CPC ..................... *G06N 5/04* (2013.01)

(58) Field of Classification Search
CPC ............... G06F 3/167; G10L 15/00
USPC .................................... 706/15, 45
See application file for complete search history.

(56) References Cited

U.S. PATENT DOCUMENTS

| | | | |
|---|---|---|---|
| 6,564,198 B1* | 5/2003 | Narayan | G06K 9/00369 706/60 |
| 7,869,887 B2 | 1/2011 | Moor et al. | |
| 2002/0116196 A1* | 8/2002 | Tran | G06F 1/3203 704/270 |
| 2003/0115192 A1 | 6/2003 | Kil et al. | |
| 2013/0103630 A1* | 4/2013 | Yao | G06N 3/0436 706/47 |
| 2013/0138250 A1 | 5/2013 | Mowery et al. | |
| 2013/0297078 A1 | 11/2013 | Kolavennu | |

(Continued)

OTHER PUBLICATIONS

Lee, "Fuzzy Logic in Control Systems: Fuzzy Logic Controller—Part I," IEEE Transactions on Systems, Man, and Cybernetics, vol. 20, No. 2, Apr. 1990.

(Continued)

*Primary Examiner* — David R Vincent
(74) *Attorney, Agent, or Firm* — Merchant & Gould

(57) ABSTRACT

A method of attaining a linguistic goal output of a process using a linguistic goal oriented decision making system, comprising setting the output value to a linguistic goal, and establishing a set of descriptive rules using historical data, wherein each descriptive rule has at least one variable, a decision variable, and at least one linguistic output value. The method further comprises grouping the set of descriptive rules into subsets of descriptive rules according to the linguistic output value of each descriptive rule and establishing decision rules based on comparing the grouped subsets of descriptive rules, the one or more decision rules describing a modification of a decision variable associated with at least one of the descriptive rules to affect the process.

18 Claims, 11 Drawing Sheets

(56) References Cited

U.S. PATENT DOCUMENTS

2014/0079297 A1* 3/2014 Tadayon .................. G06K 9/00
                                                                             382/118

* cited by examiner

LINGUISTIC GOAL ORIENTED DECISION MAKING

CROSS-REFERENCE TO RELATED APPLICATIONS

The present application claims priority to U.S. Provisional Application Ser. No. 62/050,046, filed on Sep. 12, 2014, which is incorporated herein by reference in its entirety.

INCORPORATION BY REFERENCE

Details regarding the linguistic goal oriented decision making system and methods, in addition to those discussed below, are also provided in the papers: M. R. Rajati, "Advances in linguistic data-oriented uncertainty modeling, reasoning, and intelligent decision making," Ph.D. dissertation, University of Southern California, May 2015; M. R. Rajati, J. M. Mendel, and A. S. Popa, "Fuzzy Decision Support Based on Exact Rule Matching for Liquid Lift Optimization," SPE Western Regional Meeting, Garden Grove, Calif., April 2015; and M. R. Rajati and J. M. Mendel, "Linguistic Goal-Oriented Decision Making with Rule Based Systems," submitted to IEEE Transactions on Fuzzy Systems, May 2015, the disclosures of which are also incorporated by reference in their entirety.

TECHNICAL FIELD

The present application relates generally to decision-making systems useable in processes, and in particular to goal oriented decision making for linguistically described goals in the natural language.

BACKGROUND

Complex systems with a multitude of dynamic variables require complicated decision-making methods in order to yield a desired output. Systems having thousands of dynamic variables, for example, may require the implementation of complicated mathematical techniques to define system operation and control its outputs. In many complex systems, these dynamic variables are evaluated by an operator who determines variable changes based on crude evaluations of the complex system. Accordingly, human error and personal interpretation may cause undesired changes in the system output.

Additionally, complex systems may have countless decision variables, which are variables that are adjusted in order to yield a desired output. Each variable represents various aspects of the system, wherein some variables may be discrete and others continuous. The adjustment of decision variables to yield a desired output is challenging and may lead to a rigid logical construct of the rules that describe the system. This rigid logical construct of the rules may not comport with desired control or input to the system, thereby leading to undesirable automated feedback for such systems.

For these and other reasons, improvements in existing complex system controls are desirable.

SUMMARY

In general terms, this disclosure is directed to a method of attaining a linguistic goal output of a process using a linguistic goal oriented decision-making system. The method includes setting a linguistic goal for an output value from among a plurality of linguistic goals. The method further comprises grouping the set of descriptive rules into a subset of descriptive rules, wherein each descriptive rule is established using historical data, each descriptive rule having at least one decision variable, and at least one linguistic output value, the decision variable representing an input to the process, according to the linguistic output value of each descriptive rule, and establishing one or more decision rules based on the grouped subsets of descriptive rules, the one or more decision rules describing a modification of a decision variable associated with at least one of the descriptive rules to affect the process.

In another aspect a decision-making system is disclosed. The system comprises a computing device including a processor and a memory communicatively coupled to the processor, wherein the computing device is communicatively connected to one or more data streams associated with a process and at least one input to the process. The memory stores instructions executable by the processor to perform a method of attaining a linguistic goal output of the process. The method includes changing the numerical value of input data into fuzzy sets, and aggregating decision rules to produce a decision set representing actions to take place on a decision variable based on a comparison of one or more descriptive rules defining the process, the descriptive rules each including at least a decision variable and a linguistic output value. The method also includes converting the one or more fuzzy sets to corresponding numerical output values, and adjusting the at least one input to the process based on a numerical output value.

In another embodiment of the present disclosure, disclosed is a computer-readable storage medium comprising computer-executable instructions which, when executed by a computing system, cause the computing system to perform a method of attaining a linguistic goal output of a hydrocarbon well control process using a linguistic goal oriented decision-making system. The method comprises setting at least one output value to a linguistic goal from among a plurality of linguistic goals, and establishing a set of descriptive rules using historical data, each descriptive rule having at least one decision variable, and a linguistic output value, the decision variable representing an input to the hydrocarbon well control process. The method further comprises grouping the set of descriptive rules into a subset of descriptive rules according to the linguistic output value of each descriptive rule, and establishing one or more decision rules based on the grouped subsets of descriptive rules, the one or more decision rules describing a modification of a decision variable associated with at least one of the descriptive rules to affect the hydrocarbon well control process.

DETAILED DESCRIPTION

Figure 1:
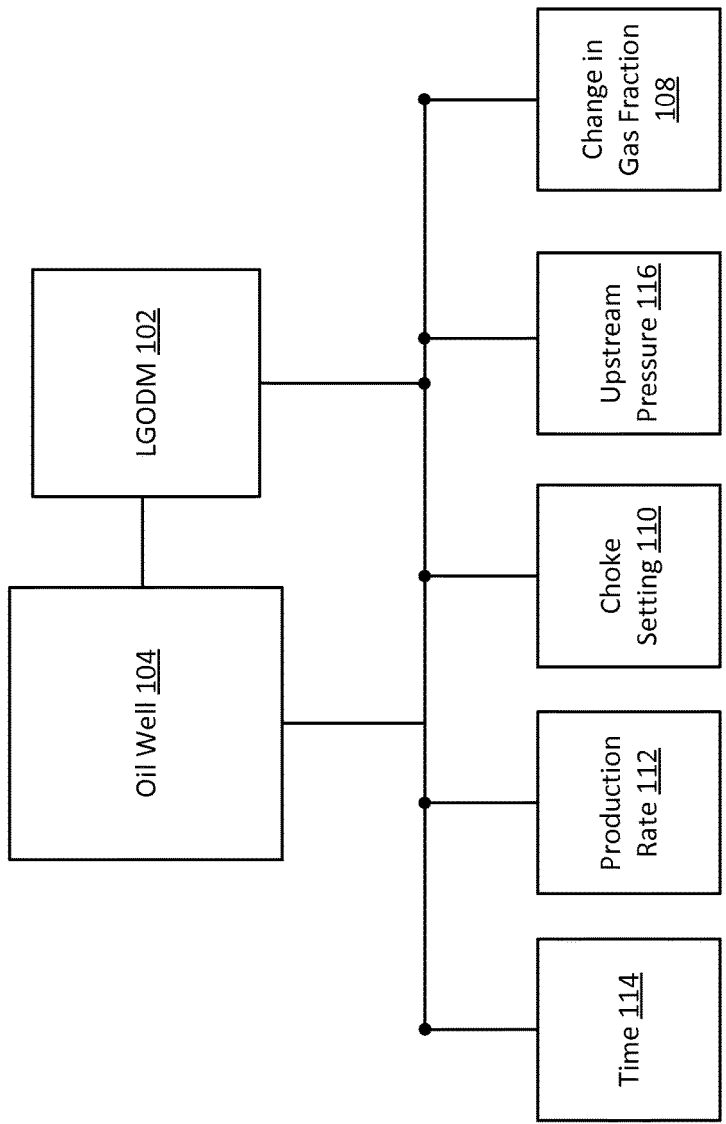
FIG. 1 illustrates an example linguistic goal oriented decision making system as used in an example environment such as an oil field, and an associated data arrangement of the oil field.

Various example embodiments will be described in detail with reference to the drawings, wherein the drawings include reference numerals and like reference numerals throughout the drawings represent like parts and assemblies. Reference to various embodiments does not limit the scope of the claims attached hereto. Additionally, any examples set forth in this specification are not intended to be limiting and are merely set forth to demonstrate some of the many possible embodiments for the appended claims.

Fuzzy logic has been widely used in systems and applications such as control and decision-making through the use of rules-based systems. Fuzzy logic is often used to model attributes based on vague, as opposed to precise concepts. For example, the concepts of "hot" and "cold" do not necessarily refer to a single temperature value, but rather, the concepts may generally refer to a range of temperature values with imprecise boundaries. In other words, fuzzy logic uses non-numerical linguistic terms (i.e., "hot" or "cold") that refer to a range of values to facilitate the expression of linguistic variables (i.e., temperature). Using a defuzzifier, the non-numerical linguistic values are quantified and transformed into a numerical output.

The present disclosure relates generally to a linguistic goal oriented decision making (hereinafter "LGODM") system, which provides a methodology for decision-making and control using fuzzy logic given a set of goals that are described in natural language. In particular, aspects of the present disclosure relate to the transformation of a set of descriptive rules that describe the behavior of the system in natural language into a set of decision rules that allow a system to achieve a goal that is stated linguistically. In other words, this disclosure presents a system and method for transforming a set of descriptive rules into a set of decision rules in order to achieve a desired linguistic goal.

As an example embodiment described herein, aspects of the present disclosure may be implemented to determine an output relating to the linguistic goal of optimal oil production from an oil well using, for example, a steamflood wellhead or a waterflood wellhead arrangement. Using aspects of the present disclosure, this can be performed by transforming variables associated with the oil well into a set of descriptive rules that describe the behavior of the system. Variables include, for example, the amount of upstream pressure of the oil or steam, change in gas fraction, etc. Such rules are thereafter grouped according to their consequents, such as low, medium, or high oil production. Upon comparison of rules and the construction of fuzzy decision systems, as described in more detail herein, decisions are made relating to how to manipulate a decision variable, such as for example, a choke setting used to control the production of oil to attain the natural language goal, for example, of high oil production.

Now referring to FIG. 1, an example embodiment of an environment, such as an oil well 104, in which aspects of the present application may be implemented. FIG. 1 illustrates a data arrangement 100 in relation to an oil well 104. Data within the data arrangement 100 represents one of a variety of types of dynamic data under observation by the LGODM system 102 for optimizing oil production of an oil well 104. In the example embodiment shown, the oil well data arrangement 100 includes a variety of data that is associated with different actors, but having functional interdependencies that are relevant to oil production. For example, the data may describe properties relating to oil production such as characteristics of the oil well 104 and its components, environmental considerations near the oil well 104, and/or systems related to the oil well 104. This example data is collected, monitored, and used by the LGODM system 102 to make decisions to reach a linguistic goal, for example, of high oil production of an oil well 104.

Figure 3:
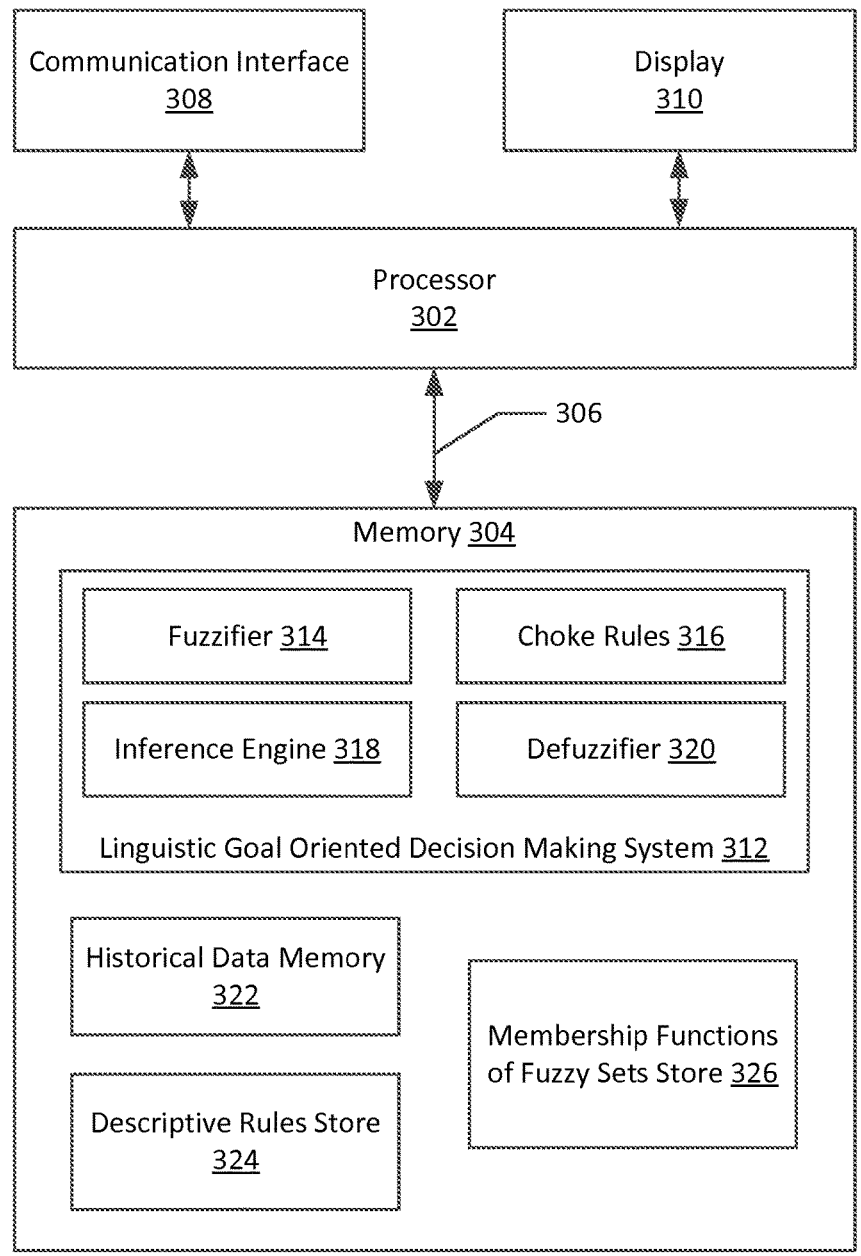
FIG. 3 is a schematic block diagram of a computing system used to implement a linguistic goal oriented decision making system, according to an example embodiment.

In this embodiment, the example data used by the LGODM system 102 includes: change in gas fraction 108, choke setting 110, production rate 112, time 114, and upstream pressure 116. Although a limited set of data in the data arrangement 100 is shown, it is known to one of ordinary skill in the art to monitor and use in the LGODM system 102 other types of data not illustrated in the data arrangement 100 of the example embodiment. Further, in embodiments, the example data is provided as data streams to a computing system for monitoring and feedback, as illustrated in FIG. 3.

Figure 2:
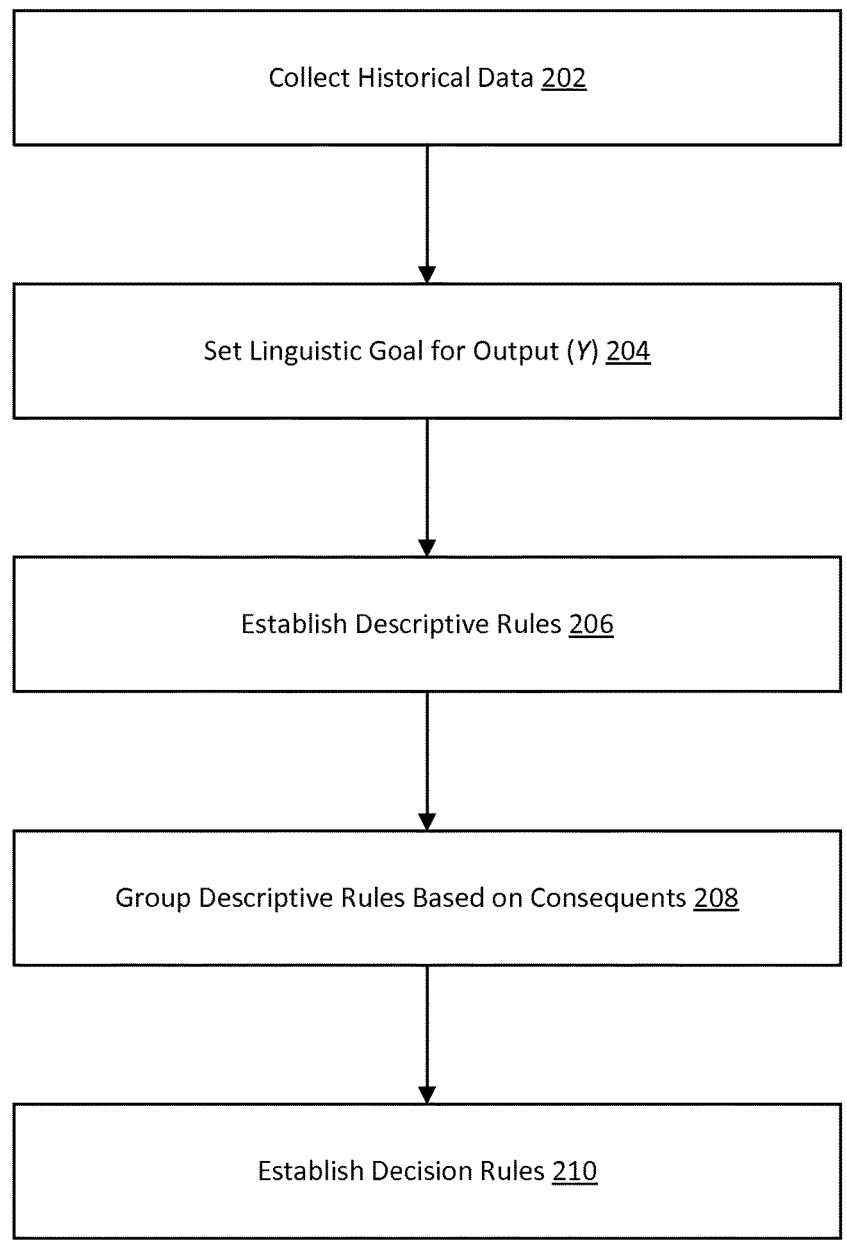
FIG. 2 is a flowchart of an exact matching process performed by a linguistic goal oriented decision making system, according to an example embodiment.

Now referring to FIG. 2, a flowchart of a process 200 performed by a linguistic goal oriented decision making system is shown, according to an example embodiment. The process 200 can be performed, for example, by the computing device of FIG. 3.

In the embodiment shown, the process 200 begins with a "collect historical data" operation 202. In the collect historical data operation 202, previously captured data is collected on all variables desired to be monitored, evaluated, and/or adjusted relating to the system being observed (e.g., an industrial process or system). Generally, variables refer to properties that relate to the functionality, or output, of a system such as an oil well 104. For example, variables may represent properties relating to the operation of an oil well 104, such as characteristics of the oil well 104 and peripheral components, environmental conditions near the oil well 104, upstream pressure, and/or characteristics of systems interrelated with the oil well 104, wherein each variable is associated with a time component. Variables also refer to an output of the system, such as oil production. Additionally, variables refer to a decision variable whose change can make the output achieve the desired goal.

Such variables may be written in an equation describing the system to be monitored and/or controlled. For example, assume that a system is defined by the following equations:

$$x(k+1)=f(x(k),u(k),k)$$

$$y(k)=g(x(k),u(k),k)$$

where $x(k)=(x_1(k) \ldots x_n(k))$ are a set of variables used to describe the system; y(k) represents the output of the system for which a certain behavior is desired and stated in natural language; and u represents a decision variable whose change can make y achieve the desired behavior in the output y. In accordance with the principles of the present disclosure, the decision variable, u, is the variable manipulated in order to achieve a desired linguistic goal for the output, y. In an example embodiment of the present disclosure, u refers to a choke that is used to restrict and control the flow of oil during production and y refers to production rate of oil. Note that the presented function is based on the assumption that each variable depends on a time (k); $y(k)=g(x(k), u(k), k)$.

Accordingly, in operation 202, historical data relating to the following variables is collected to establish the LGODM: $x_1(k), x_2(k), \ldots, x_n(k), u(k)$, and $y(k)$ for $k=0, 1, \ldots, K$. Once established, the LGODM system 102 uses real time data of the system at each time step, k, to determine how to manipulate the decision variable, u(k), to attain an output, y(k), that eventually satisfies the linguistic goal.

In the "set linguistic goal for output" operation 204, a linguistic goal, stated in natural language, is established for the output y(k). Generally, a linguistic goal for the output y(k) may be set as, for example, "increase the amount of flow" in a process control system; "increase profit" in a business activity; "reduce the frequency of fluctuations" in a mechanical system; or "achieve medium glucose levels in the blood" for the human body. In the example embodiment, a linguistic goal for y(k), which represents the production rate of oil may be set as low or high. The linguistic goal may further have intermediate levels such as medium, medium low and medium high. The set of values for the output y(k) (e.g., low, medium, and high) is characterized as a term set. It is noted that although the terms "low," "medium," and "high" are used throughout this specification, other appropriately descriptive terms may also be used to describe a set of values for the output.

In the "establish descriptive rules" operation 206, data for each variable x, u, and y at each time k are collected and used to establish descriptive rules that represent a model of the particular system. In general, the descriptive rules describe, in natural language, the behavior of the system using fuzzy IF-THEN statements. In each descriptive rule, a term set (e.g., low, medium, and high) is associated with each variable, and fuzzy sets are determined, wherein the fuzzy sets represent a grade of membership relating to a linguistic term. For example, the terms low, medium, and high do not correspond to a single numerical value, but rather, each term relates to varying grades of membership along a range.

In some embodiments, the data for building these descriptive rules is established using historical data, experts with knowledge of the particular system (e.g., expert data), or a combination of experts (e.g., expert data) and historical data. An example of a descriptive rule is as follows:

$R_{descriptive}$: IF $x_1$ is $A_1$ and $x_2$ is $A_2$ and $\ldots x_n$ is $A_n$ and $u$ is $B$, THEN $y$ is $C$.

As shown in this example, the descriptive rule has variables $x_1, x_2, \ldots, x_n$ and decision variable u in the antecedent and output, y, in the consequent. Additionally, each variable in each descriptive rule, $R_{descriptive}$, is associated with a term set (e.g., low, medium, and high).

In operation 208, descriptive rules are grouped according to similar words in their consequents. In other words, each of the N descriptive rules is grouped according to the same linguistic goal in its consequent (i.e., rules with consequents having exactly the same word are grouped together). For example, each descriptive rule with an output, y, resulting in low production, is grouped in a low production group. Thus, the set of N descriptive rules is transformed into subsets of decision rules, each subset attaining a particular linguistic goal. Accordingly, decisions can be linguistically described based on which variables (conditions) will yield a particular output. For example, for the output, y, which refers to the production rate of oil, categories of low, medium, and high are created and rules with low, medium, or high in their consequents are grouped into one of these three groups. Based on this grouping, situations in which production rates will be low, medium, or high can be articulated in natural language. Accordingly, the rules can be compared in order to find situations in which changes in the decision variable (e.g. the choke setting) drives the output variable (e.g. the production rate) towards the desirable outcome (high production rate).

In operation 210, descriptive rules are compared between the respective groups and decision rules are established. In order to achieve the desired linguistic goal for the output, y, the decision variable, u, represents the manipulated variable. Accordingly, pairs of descriptive rules, one from a less desirable category, for example, low, and one from a more desirable category, for example, high, having similar antecedents, are found. For example, consider the following two descriptive rules:

$R^-$: If $(x_1$ is $A_1^+$ and $x_2$ is $A_2^+$ and $\ldots x_p$ is $A_p^+$ and $u$ is $B^-$) then $y$ is $C^-$ $R^+$: If $(x_1$ is $A_1^+$ and $x_2$ is $A_2^+$ and $\ldots x_p$ is $A_p^+$ and $u$ is $B^+$) then $y$ is $C^+$ In this example, descriptive rules $R^+$ and $R^-$ have identical antecedents but for the antecedent describing the decision variable, u. Accordingly, the difference in output, y, is a result of the difference in value of the decision variable, u. Thus, in order to obtain the output, $C^+$, when the variables $(x_1, x_2, \ldots x_n)$ are as described above in the descriptive rule K, the decision variable u is manipulated so that $R^-$ resembles $R^+$ (i.e., increase or decrease u so that it is closer to $B^+$). In other words, the two descriptive rules having the same variables, x, and differing outputs, y, are compared. Then, the difference between the fuzzy sets describing the variable, u, in both rules is determined. This value, if applied to u causes the output, y, to drive towards a desired output. Accordingly, a decision rule is generated that describes conditions $(x_1, x_2, \ldots x_n)$ in a rule that can potentially yield a specified linguistic outcome in y, when u is deterministically manipulated. In other words, the decision rule is used to linguistically describe conditions that will result in a desired output. Accordingly, the specific decision rule, based on the comparison of descriptive rules $R^-$ and $R^+$ is described as the following equation:

$R_{decision}$: If $(x_1$ is $A_1^+$ and $x_2$ is $A_2^+$ and $\ldots x_p$ is $A_n^+$ and $u$ is $B^-$) then $\Delta u$ is $B^+\theta B^-$;

where $B^+\theta B^-$ is a fuzzy set. The fuzzy set, $B^+\theta B^-$ is the fuzzy subtraction of the fuzzy sets $B^+$ and $B^-$ and is computed using fuzzy arithmetic and the Extension Principle. Specifically:

$\mu_{B^+\theta B^-}(z) = \sup_{z=s-v} \min(\mu_{B^+}(s), \mu_{B^-}(v))$.

where $\mu_{B^+}(s)$, $\mu_{B^-}(v)$, and $\mu_{B^+\theta B^-}(z)$ respectively denote the membership functions of the fuzzy sets $B^+$, $B^-$ and $B^+\theta B^-$.

Additionally, a set of decision rules directed towards maintaining the decision variable, u, when the output, y, is in its desired state, i.e., when the intermediate goal ($C^+$) equals the target goal ($C^*$), is provided as follows:

$R_{decision1}$: If ($x_1$ is $A_1^*$ and $x_2$ is $A_2^*$ and ... $x_n$ is $A_n^*$ and $u$ is $B^-$) then $\Delta u$ is $B^* \theta B^-$.

$R_{decision2}$: If ($x_1$ is $A_1^*$ and $x_2$ is $A_2^*$ and ... $x_p$ is $A_n^*$ and $u$ is (already)$B^*$) then $\Delta u$ is Around Zero (unchanged)

where the antecedents of a descriptive rule that has C* in its consequent are denoted as $A_i^*$, i=1, ..., p and B*.

Figure 2A:
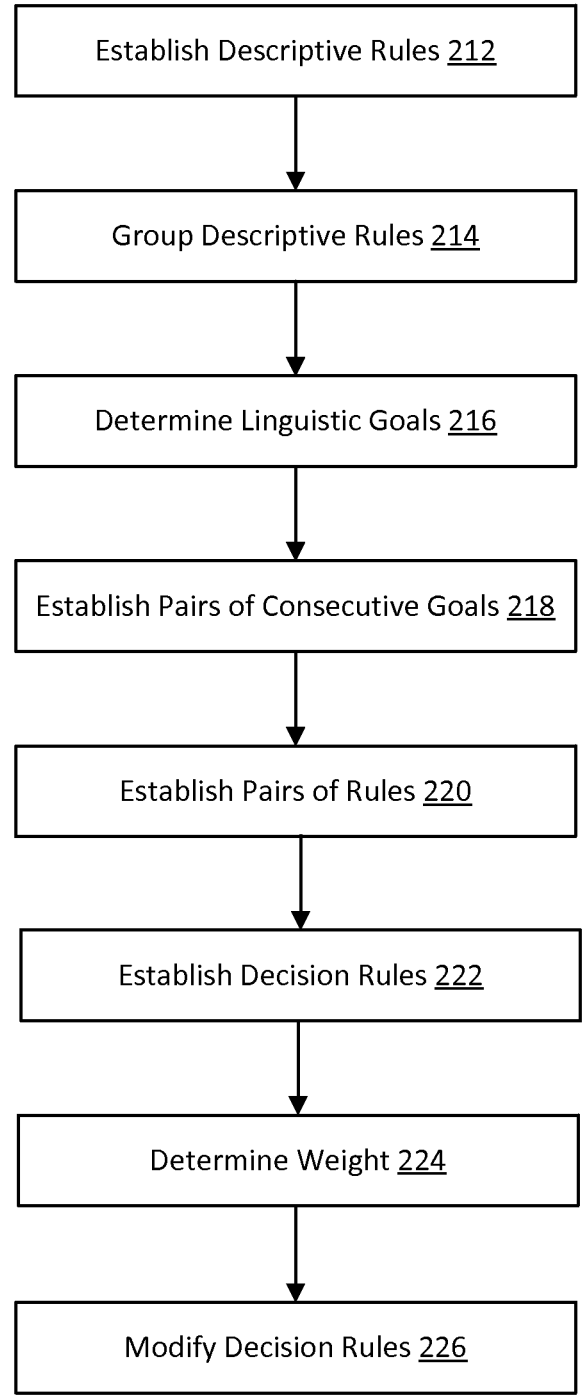
FIG. 2A is a flowchart of a similarity process performed by a linguistic goal oriented decision making system, according to an example embodiment

In FIG. 2A a flowchart of a similarity process 250 performed by a linguistic goal oriented decision making system is shown. In some embodiments, finding two rules having the same ($x_1$, $x_2$, ... $x_n$) variables may not be possible. In such embodiments, the method for generating a decision rule can be amended to find two decision rules that are similar rather than exact. To do so, similarity between decision rules is measured between two fuzzy sets. The process 250 can be performed, for example, by the computing device of FIG. 3.

In operation 212, descriptive rules are established after historical data is collected, similar to the establishment of descriptive rules as set forth herein with reference to exact matching (FIG. 2). In establishing descriptive rules, data for each variable x, u (decision variable), and y (output) at each time k is collected and used to establish descriptive rules that represent a model of the particular system. Each descriptive rule has at least one decision variable, u, and possibly some other influential variable(s), $x_1$, ..., $x_n$ in their antecedents and one output y in their consequent.

Next, in operation 214, the descriptive rules are grouped into M groups, according to the M possible consequents for the output variable, y. For example, descriptive rules are grouped based on whether the output variable describes low production, moderate production, or high production. In other words, each of the descriptive rules is grouped according to the same linguistic goal in its output (i.e., rules with consequents having exactly the same word are grouped together). Grouping descriptive rules is similar to the grouping of descriptive rules described herein with reference to exact matching.

In operation 216, a determination is made regarding which linguistic goal is to be achieved as well as all intermediate goals. The goal to be achieved is designated as the ultimate goal. For example, in embodiments where there are three groups, such as low, moderate, and high production, the ultimate goal is high production and the intermediate goal is moderate production. Alternatively, additional groups may also be considered, such as, for example, low, moderate low, moderate, moderate high, and high production levels. In such an embodiment, the intermediate linguistic goals are moderate low, moderate, and moderate high. However, if the ultimate goal is moderate (for example, in a blood glucose monitoring example), then the intermediate goals are moderate low and moderate high.

Next, in operation 218, all possible pairs of consecutive goals are established. In those pairs of consecutive goals, the first goal is the less desirable goal and the second goal is more desirable. Using the example having high oil production as an ultimate goal from the goals of low, moderate, and high oil production, the two groups are established: (low, moderate) and (moderate, high). Note that the consecutive pairing of the goals is to avoid abrupt changes in the system, however other groups such as (low, high) may also be established. Alternatively, in the example having five goals (low, moderate low, moderate, moderate high, and high), four groups may be established: (low, moderate low), (moderate low, moderate), (moderate, moderate high), and (moderate high, high). In each pair of consecutive goals, the first goal is the less desirable goal, which is designated as the primary goal ($C^-$) of the pair. The second goal is the more desirable goal, which is designated as the target goal ($C^+$). For example, in the group (low, moderate), low is the primary goal and moderate is the target goal. Additionally, the ultimate goal is designated (C*), e.g., high, and can be set as the ultimate goal for oil production.

Next, in operation 220, pairs of rules are established such that the first rule has the primary goal ($C^-$) in its consequent and the second pair has the target goal ($C^+$) in its consequent. For example, the following pair of rules may be established:

$R^-$: If ($x_1$ is $A_1^-$ and $x_2$ is $A_2^-$ and ... $x_p$ is $A_p^-$ and $u$ is $B^-$) then $y$ is $C^-$ $R^+$: If ($x_1$ is $A_1^+$ and $x_2$ is $A_2^+$ and ... $x_p$ is $A_p^+$ and $u$ is $B^+$) then $y$ is $C^+$ Next, in operation 222, two decision rules are established by comparing $R^-$ and $R^+$. A first decision rule (T) is identified as the transition rule and a second decision rule (P) is identified as the preservation rule:

$T$: If ($x_1$ is $A_1^-$ and $x_2$ is $A_2^-$ and ... $x_n$ is $A_n^-$ and $u$ is $B^-$) then $\Delta u$ is $B^+ \theta B^-$ $P$: If ($x_1$ is $A_1^+$ and $x_2$ is $A_2^+$ and ... $x_n$ is $A_n^+$ and $u$ is $B^-$) then $\Delta u$ is $B^+ \theta B^-$ In operation 224, for each decision rule that is established in operation 222, a weight for both decision rules is calculated. For example, the following weight is calculated for the decision rules T and P:

$$w_{R^- \to R^+} = \frac{1}{n} \sum_{r=1}^{n} \frac{\int_{X_r} \min(\mu_{A_r^-}(x), \mu_{A_r^+}(x)) dx}{\int_{X_r} \max(\mu_{A_r^-}(x), \mu_{A_r^+}(x)) dx}$$

Note that if $A_r^+$ and $A_r^-$ are highly similar, the T-rule is highly credible, and it drives the output towards $C^+$. The less similar that $A_r^+$ and $A_r^-$ are, the less credible the T-rule becomes. The weight $w_{R^- \to R^+}$ is a measure of the credibility of the rule and determines how much the rule contributes to the output of the fuzzy decision system.

If the target goal is equal to the ultimate goal, for example if $C^+=C^*$ (wherein the target goal $C^+$ is equivalent to the ultimate goal C*, (e.g., high production and not an intermediate goal such as medium production)), then the following decision rule is established in operation 222:

$P$: If ($x_1$ is $A_1^*$ and $x_2$ is $A_2^*$ and ... $x_p$ is $A_p^*$ and $u$ is (already) $B^*$) then $\Delta u$ is Around Zero (unchanged) and the weight is *set* to 1.

Note that the antecedents of the descriptive rule that has C* in its consequent are denoted as $A_i^*$, i=1, ..., p and B*.

Finally, in operation 226, the decision rules are modified. In particular, the consequent of the two rules are modified by taking a triangular norm between their membership functions and the weight. The following modified decision rules are therefore established:

$T$: If ($x_1$ is $A_1^-$ and $x_2$ is $A_2^-$ and ... $x_p$ is $A_p^-$ and $u$ is $B^-$) then $\Delta u$ is $D$ $P$: If ($x_1$ is $A_1^+$ and $x_2$ is $A_2^+$ and ... $x_p$ is $A_p^+$ and $u$ is $B^-$) then $\Delta u$ is $D$ Where $\mu_D(x) = \min(\mu_{B^+ \theta B^-}(x), w_{C^- \to C^+})$ Note that when $C^+=C^*$, then the rules have unit weights and do not require modification. Accordingly, the collection of modified rules that are established serve as decision rules in embodiments where the method for generating a decision rule is found from decision rules that are similar, rather than exact.

Although a specified linguistic goal is identified for the output, y, in many decision making problems, abrupt changes in the output are not desirable; therefore, it may be appropriate to drive the output variable to its desired value gradually. To achieve this, intermediate goals for the output, y, are set, thereby allowing y to reach its desired linguistic goal by transitioning gradually between predefined intermediate goals before finally reaching the specified output. For example, consider the case where the output, y, is described by the following term set: low, medium low, medium, medium high, and high and that y is to be driven from low toward high. Rather than driving y directly to high, the LGODM system 102 may establish intermediate decision rules to drive the output, y, from low, to medium low, to medium, to medium high, then finally to high. The same principle for gradually moving between intermediate states is true for the reverse when the ultimate goal for y is identified as low and the output is currently at a high state or a higher state. Accordingly, in this example, three intermediate goals are identified: medium low, medium, and medium high. Although these term sets are described herein, it is well known to one or ordinary skill in the art to use any variety of intermediate goals within term sets having a variety of terms as outputs of a system.

The collection of all the decision rules, including the rules that gradually drive the output, y, to fuzzy sets near the desired outcome, and those maintaining the output, y, when it is in a desired state, functions as the fuzzy decision system that attains the natural language linguistic goal specified for the output, y.

Referring now to FIG. 3, a schematic block diagram of a computing system 300 is shown. The computing system 300 can be, in some embodiments, used to implement the linguistic goal oriented decision-making (LGODM) system 102. In general, the computing system 300 includes a processor 302 communicatively connected to a memory 304 via a data bus 306. The processor 302 can be any of a variety of types of special-purpose or general-purpose programmable circuits capable of executing computer-readable instructions to perform various tasks, such as mathematical and communication tasks.

The memory 304 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In the embodiment shown, the memory 304 stores a linguistic goal oriented decision making (LGODM) system 312, which represents a computer-executable application that can implement the linguistic goal oriented decision making (LGODM) system 102 discussed in further detail herein.

However, those of ordinary skill in the art will appreciate that an "application" is not necessary to implement the LGODM 102, and instead, for example, the memory 304 may store computer instructions executable by the processor 302 to carry out the disclosed operations described in this disclosure. Both the processor 302 and the memory 304 may be physical items. Furthermore, in some embodiments, at least one programmable logic controller (PLC) may be utilized to carry out the disclosed operations described in this disclosure.

Returning to the memory 304, the memory 304 additionally includes a historical data memory 322 for storing the historical data associated with the variables discussed herein. The memory 304 further includes a descriptive rules store 324 for storing descriptive rules. Additionally, the memory 304 stores membership functions of fuzzy sets 326 that include fuzzy membership functions.

The computing system 300 can also include a communication interface 308 configured to receive data streams and transmit notifications as generated by the LGODM system 312, as well as a display 310 for presenting various indicators or issues relating to a system under observation, for displaying numerical values of the decision variable, u, or allowing a user to define entities within a system to be monitored or events to be monitored by the application 312. The communication interface 308 and/or the display 310 may also be coupled to any number of input/output devices, for example, for receiving user input (e.g., expert data discussed in connection with FIG. 2 at 206.

The LGODM system 312 is used to transform a set of linguistic rules that describe, in natural language, the behavior of a system into a set of decision rules that allow a system to achieve a linguistically described goal. Generally, the LGODM system 312 includes a fuzzifier 314, choke rules 316, an inference engine 318, and a defuzzifier 320. The fuzzifier 314 is defined in memory and used by the LGODM system 312 to convert the measurements into fuzzy sets that can be fed into the rule-base of LGODM for inference, as discussed with reference to FIG. 2.

The decision rules 316 are also stored within memory 304 of the LGODM system 312. In the example embodiment of the LGODM system 312, decision rules 316 are used to determine how to manipulate the decision variable, u, which is, for example, a choke setting, in order to attain the linguistic goal for the output, y, which is, for example, high oil production.

The inference engine 318, stored within memory 304, of the LGODM system 312 is used to aggregate the generated linguistic decision rules to yield a fuzzy decision using the calculi of fuzzy IF-THEN rules.

The defuzzifier 320, stored within memory 304, of the LGODM system 312 is used to convert the fuzzy decision set generated by the inference engine 318 to a concise, numerical output value. In the context of the present disclosure, the defuzzifier generates this numerical output value, such as a choke setting, that is used to achieve the natural language goal of, for example, high oil production.

Figure 4:
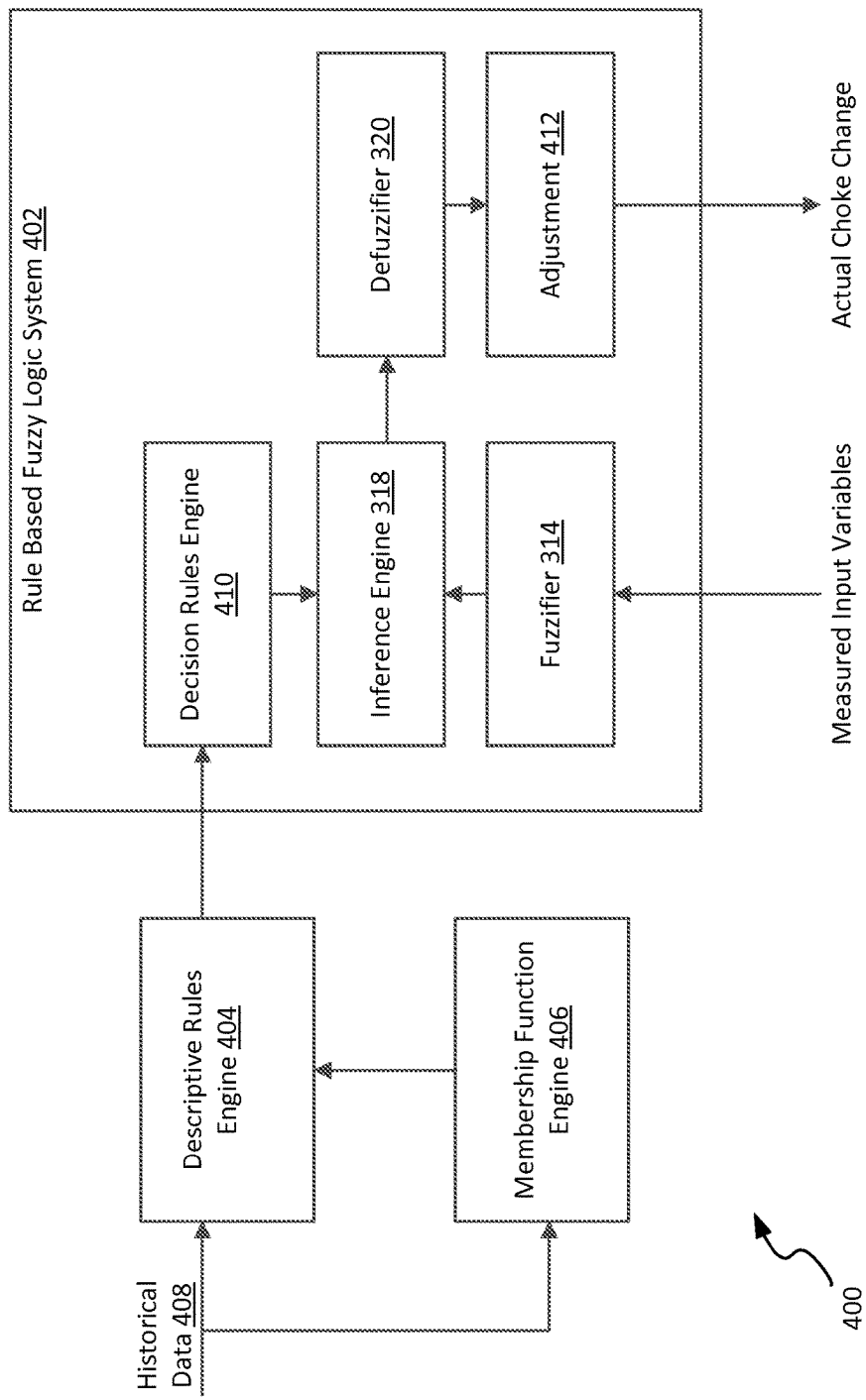
FIG. 4 is a schematic block diagram of a linguistic goal oriented decision making system, according to an example embodiment.

Referring now to FIG. 4, a schematic block diagram of a LGODM system 400 is shown. As illustrated, the LGODM system 400 can represent an example implementation of the LGODM system 102 of FIG. 1, and includes a rule-based fuzzy logic system 402, a descriptive rules engine 404 and a membership function of fuzzy sets engine 406. As discussed herein, the LGODM system 400 is used to build a set of fuzzy rules using a rule-based description system to attain a linguistic goal for the output of the intended system.

Accordingly, LGODM system 400 includes a descriptive rules engine 404 that is built using historical data 408. In an example embodiment of the present disclosure, the data 408 that is used to build the descriptive rules engine 404 refers to previously captured historical data on all variables desired to be monitored, evaluated, and/or adjusted relating to the system, such as an oil well 104 as shown in FIG. 1. The historical data 408 collected may refer to, for example, environmental conditions such as upstream pressure, rate of oil production, choke setting, and change in gas fraction, among others. In some embodiments, the data 408 collected is historical data, yet in other embodiments, data collected is knowledge and data from experts (e.g., expert data), and in other embodiments, data collected is a combination of historical and expert data. In still further embodiments, the system 400 can be interfaced to alternative processes, as discussed in further detail below.

In the embodiment shown, the historical data 408 is used by the descriptive rules engine 404 to establish descriptive IF-THEN rules as described with reference to FIG. 2. As discussed herein, descriptive rules establish, using natural language, a model of the system intended to be monitored, such as an oil well 104. In some embodiments, the descriptive rules are written in the form of an IF-THEN statement and include system variables $(x_1, \ldots x_n)$, decision variable u, and output y. The descriptive rules also include within them, a fuzzy set, which describes each variable with respect to a term within the term set, for example (low, medium, or high).

In example embodiments of the present disclosure, the membership function engine 406 is used to establish the membership functions of the fuzzy sets of the descriptive rules. In other words, the membership function engine 406 establishes graded membership functions relating to a linguistic term. For example, a term such as low, medium, or high production is associated with each variable and each relate to varying grades of membership along a range because these linguistic descriptions do not correspond to a single numerical value.

In the rule-based fuzzy logic system 402, the rules engine 410 is used to establish decision rules that linguistically describe under what conditions the output will result in the desired linguistic goal. Additionally, the fuzzifier 314 is used to generate fuzzy data sets for each variable in the antecedents of the decision rules.

In the rule-based fuzzy logic system 402, the inference engine 318 aggregates the generated linguistic descriptive rules to yield a fuzzy decision set to apply to the output using the calculi of the fuzzy IF-THEN rules. Additionally, the defuzzifier 320 is used to convert the fuzzy decision set generated by the inference engine 318 to a precise, numerical output value, which is communicated to the adjustment engine 412 that performs the adjustment of the output (in the example shown, a change to a choke, such as may be utilized in the data arrangement 100 of FIG. 1).

Figure 5:
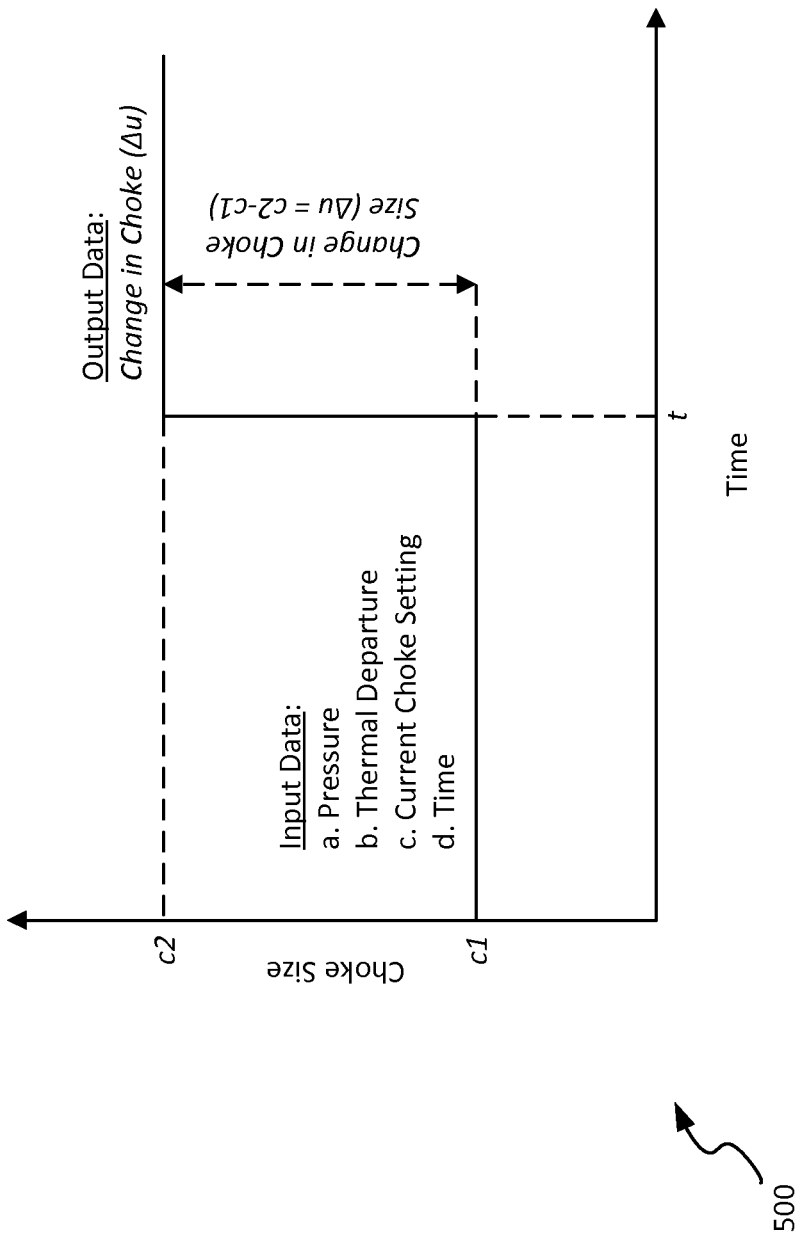
FIG. 5 is a chart illustrating the operation of a linguistic goal oriented decision making system.

Now referring to FIG. 5, a chart 500 illustrating the operation of an example LGODM system 102 is shown. According to an example embodiment of the present disclosure, the LGODM system 102 is used in relation with an oil well 104 having a choke, which is used to control the production of oil by modifying the flow and pressure of the output fluid, which may be a mixture of oil, water, steam, etc. The size of the choke determines the amount of oil produced. Hence, optimal size changes in the choke increase the production of oil. In the chart 500 shown, the y-axis 502 illustrates choke size and the x-axis 504 indicates time. As indicated in the chart, the LGODM system 102 evaluates input variables associated with, for example, pressure, change in gas fraction, current choke position, with respect to time and generates an optimal choke size as output data. In this example chart 500, the LGODM system 102 evaluated the input variables and generated an output value (i.e., an increased choke size) at time t. As shown, the change in choke size, $\Delta u$, is graphically represented as $c_2 - c_1$.

Figure 6:
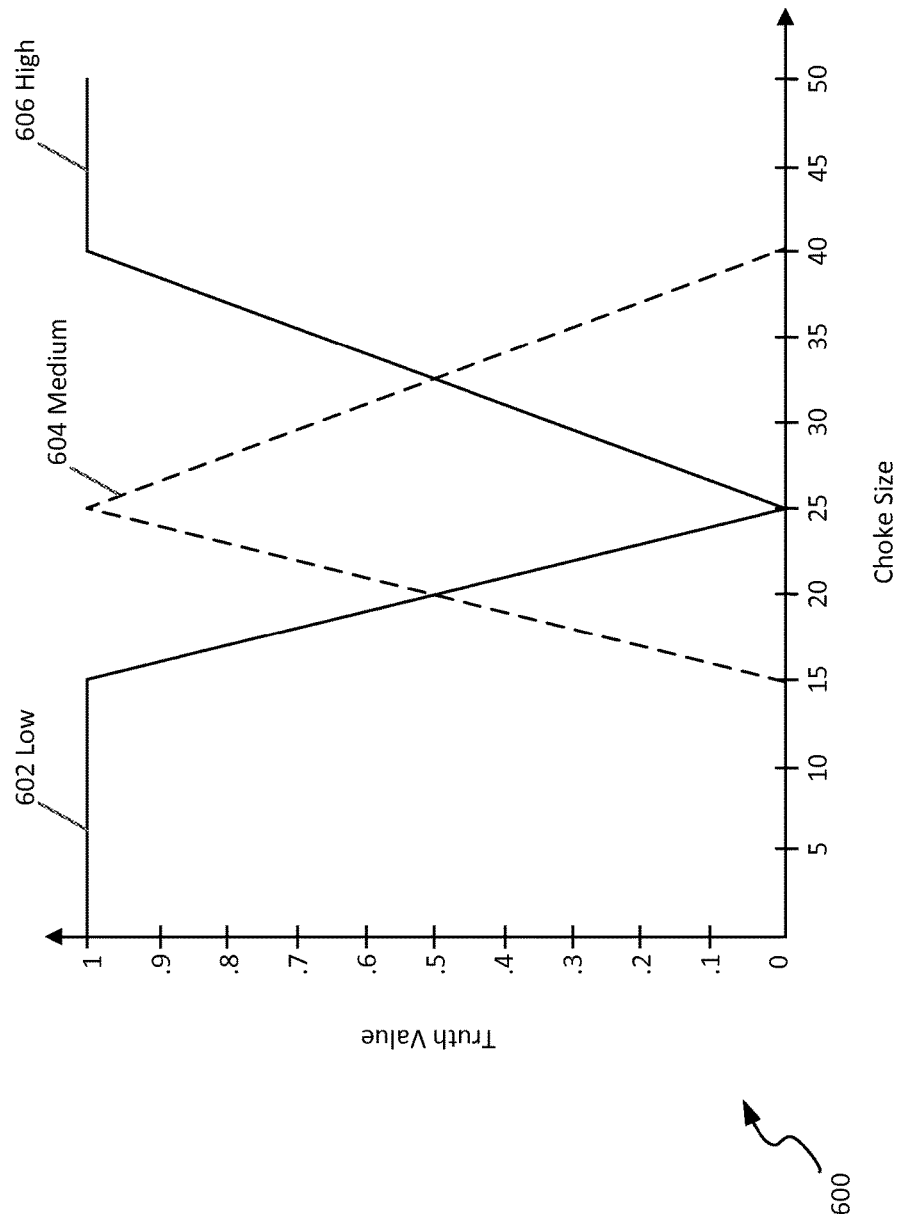
FIG. 6 is a graph illustrating example membership functions on a graded scale.

Now referring to FIG. 6, a graph 600 illustrating membership functions on a graded scale is shown. In principles of the present disclosure, goals are linguistically described in natural language. Embodiments of the present disclosure include modeling non-numerical linguistic goals using fuzzy sets, in order to represent such qualities over grades of membership. As discussed herein, fuzzy sets with graded membership functions relating to a linguistic term are generated, such as, for example, low, medium, or high. Within the context of the example embodiment, the linguistic goals of low production, medium production, and high production are translated into a set of graded membership functions that illustrate a fuzzy range of values that approximately characterize these linguistic production goals. Three membership functions are shown in the graph 600: a low production membership function 602, a medium production membership function 604, and a high production membership function 606. The x-axis illustrates choke size and the y-axis illustrates a percentage of truth. Accordingly, in this example, the low production membership function 602 spans a range between 0 and 25 units, and the range between 0 and approximately 14 units is associated with a high percentage of truth (100%). In this example, the medium production membership function 604 spans a range between 15 and 40 units, and the range between approximately 23 and 30 units is associated with a high percentage of truth (70%-100%). The high production membership function 606 spans a range between 25 and 50 units, and the range between approximately 40 and 50 units is associated with a high percentage of truth (100%).

Figure 7:
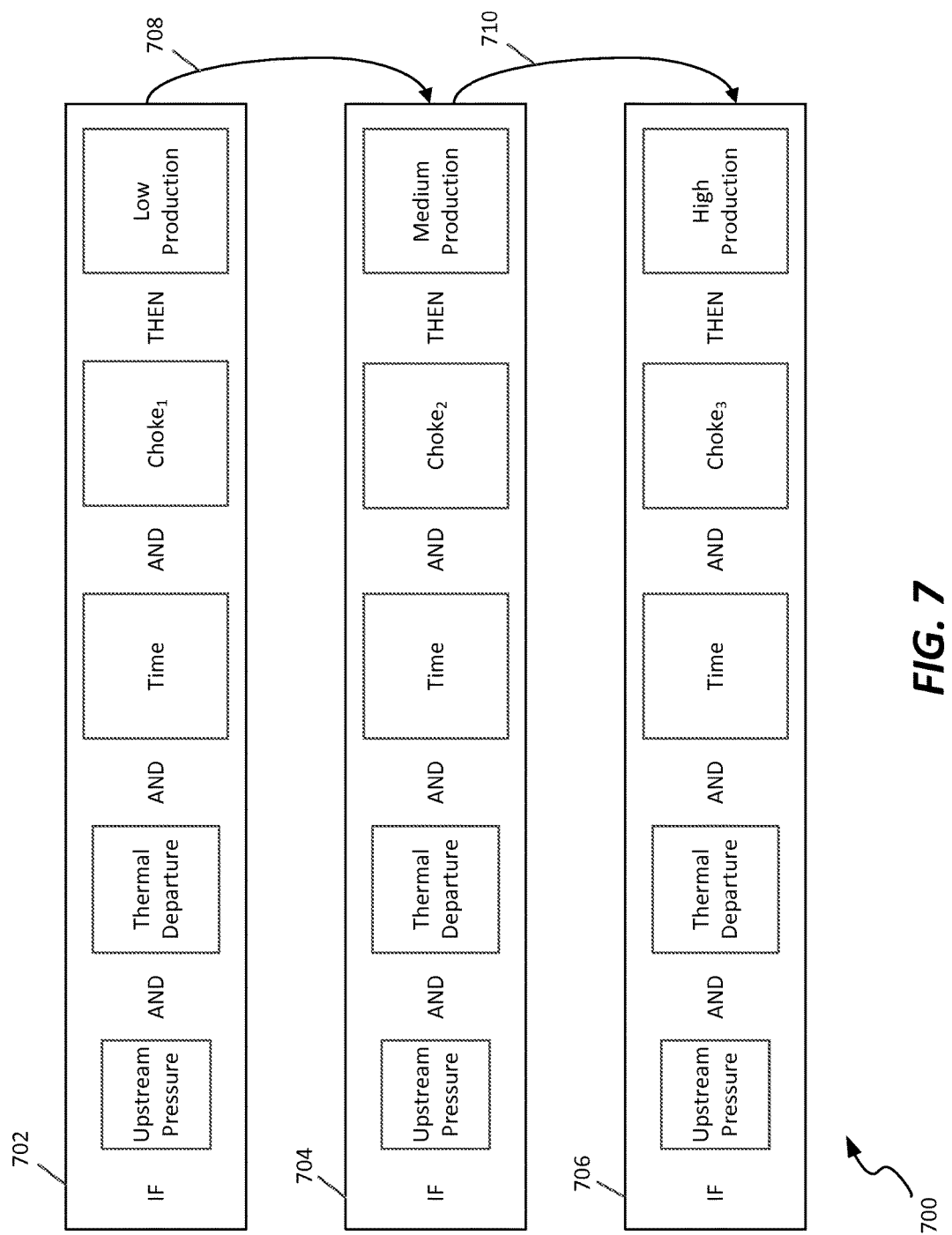
FIG. 7 is a block diagram illustrating three example categories of descriptive rules and the associated decision rules.

Now referring to FIG. 7, an example block diagram 700 illustrating three categories 702, 704, and 706 of descriptive rules is shown. In this example embodiment, each of the three categories 702, 704, and 706 are grouped according to the linguistic goal in the consequent. In other words, categories 702, 704, and 706 are grouped according to their output (low production, medium production, and high production). As discussed herein, this categorization allows for linguistically describing situations that will yield a low, medium, or high production rate. Also shown, each descriptive rule in the categories 702, 704, and 706 has upstream pressure, change in gas fraction, and time variables as well as a choke setting decision variable in its antecedents.

As discussed, decision rules are established in order to determine how to drive the output, for example, from low production to high production. This can be accomplished by comparing the descriptive rules in the initial rule group (e.g., low production) to descriptive rules in the final rule group (e.g., high production). In the example embodiment, the comparison is done on rules with the same antecedents (e.g., upstream pressure, change in gas fraction, and time). As discussed herein, in some embodiments, it may be necessary to drive the output gradually, for example, from low production, to medium production, or from medium production to high production. In this example embodiment, driving the production goal from low production to medium production and from medium production to high production is identified by arrows 708 and 710, respectively.

Figure 8:
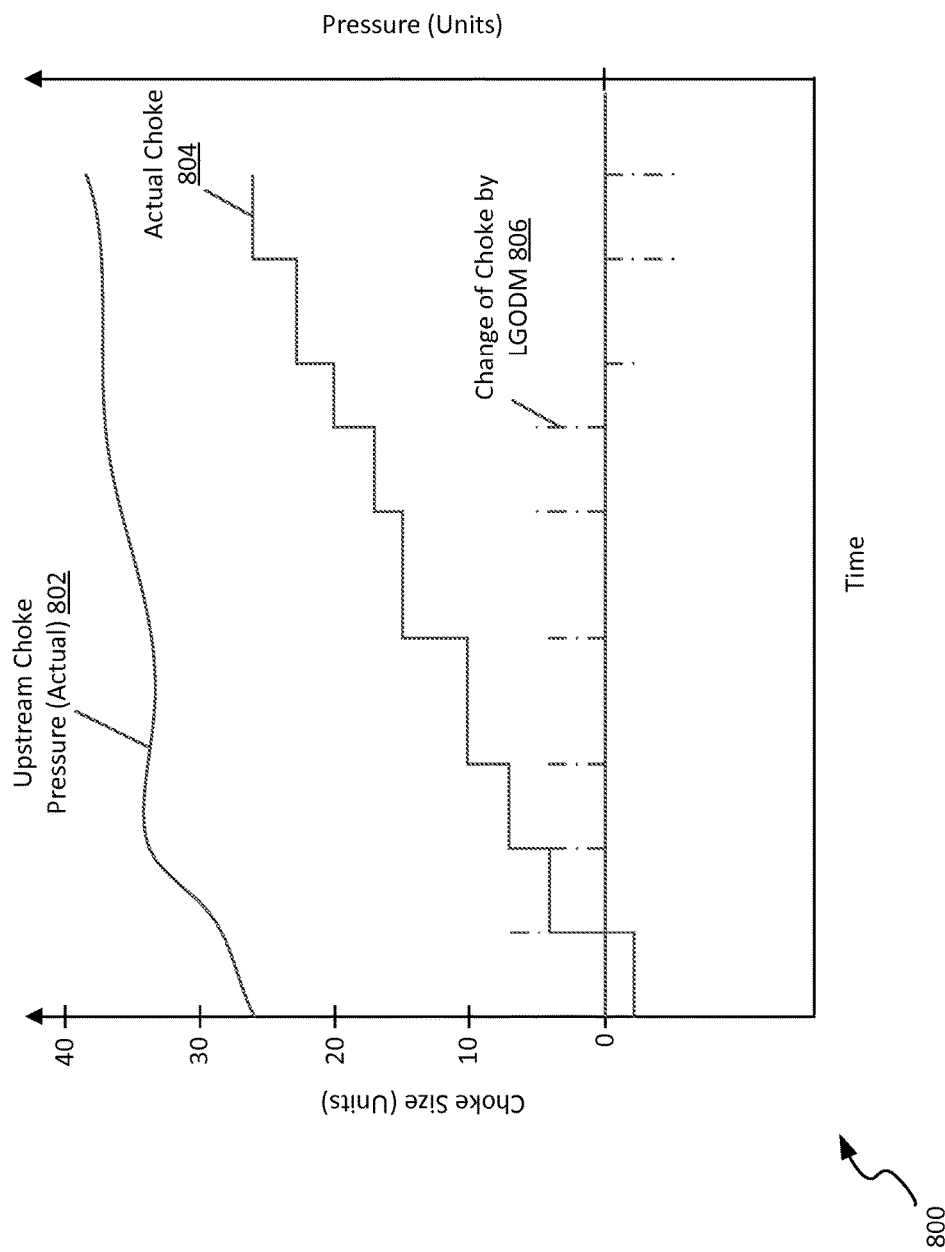
FIG. 8 is a chart illustrating example test data demonstrating the performance of the linguistic goal oriented decision making system.

Now referring to FIG. 8, a chart 800 illustrating test data demonstrating the performance of the LGODM system 102 is shown. The chart 800 illustrates the behavior of actual upstream choke pressure 802 over time in response to an actual choke setting 804 that was adjusted manually. In some embodiments, it is desirous to maintain the flow pressure of the oil well 104, and in other embodiments it is desirous to adjust the flow pressure, in order for the well to produce more oil. As shown, the flow pressure (hence the production of oil) is directly related to an adjustment in the choke setting. This example embodiment depicts a situation where it is desirous to increase the choke setting 806 up to approximately 19 units. Accordingly, it is shown that the actual choke size 804 was manually and incrementally increased in order to test the well and monitor upstream choke pressure 802. While the manual increase in the choke setting goes as far as 30 units, the LGODM system recommended decrease in the choke when it exceeds 19 units, suggesting that the best choke setting for the well in the current situation is around 19. The example of FIG. 8 is provided for illustrative purposes and should not limit the scope of the present disclosure.

Figure 9:
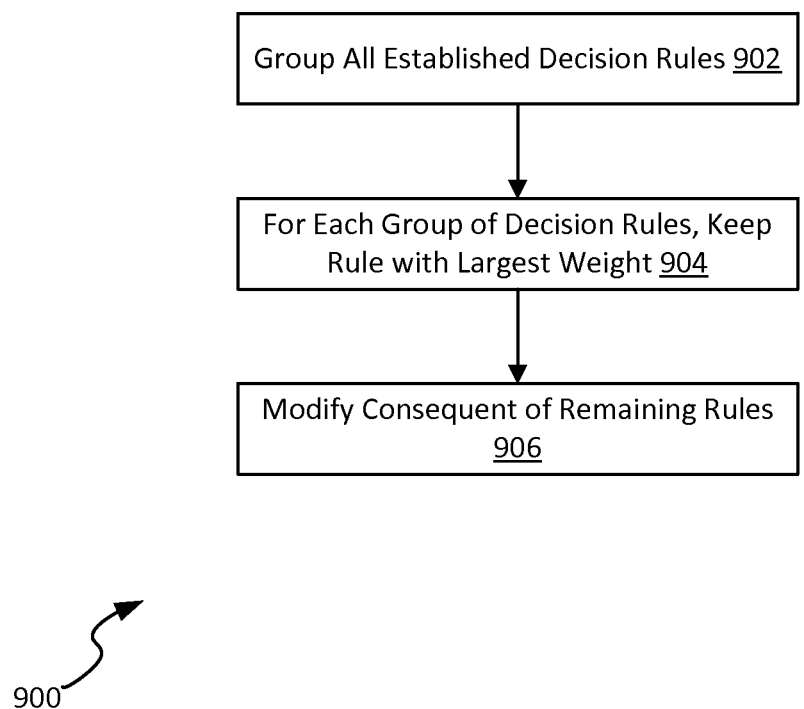
FIG. 9 illustrates an example pruning process.

Now referring to FIG. 9, shown is a flowchart of a pruning process 900 performed by a linguistic goal oriented decision making system. As described in FIG. 2A, a similarity process 250 is performed by a linguistic goal oriented decision making system. Similarity matching refers to a method for generating a decision rule to find at least two decision rules that are similar rather than exact and constructing weighted decision rules. FIG. 9 illustrates a pruning process 900, which describes how to prune those weighted decision rules that include groups of rules that share exactly the same antecedents and consequents, but have different weights. In other words, pruning refers to grouping rules with exactly the same consequents and antecedents and discarding all but one rule with the largest weight.

Prior to beginning the pruning process 900, it is assumed that operations 212-224 of FIG. 2A are initially performed (i.e., decision rules are established and for each established decision rule, a weight is calculated). The pruning process 900 thereafter begins at operation 902, in which all established decision rules are grouped. In particular, operation 902 involves grouping those decision rules that have exactly the same antecedents and consequents. Note, however, that these grouped decision rules may have different weights.

The pruning process 900 flows to operation 904. In operation 904, for each group established in operation 902, the rule with the largest weight is retained and the remaining rules in that group are discarded. Accordingly, one rule for each group is retained.

In operation 906, the remaining rules (i.e., the set of rules containing one surviving rule from each group established in operation 902) are modified to obtain modified decision rules. In particular, the consequent of the remaining rules are modified by taking a triangular norm between the membership functions and the associated weight of that rule. Such modification of the remaining rules takes into account the effect of the rule weight.

If a minimum triangular norm is used, the membership function of the consequent of a remaining rule is calculated as: $\mu_D(z)=\min(\mu_{B^+\theta B^-}(z), w(R^-, R^+))$, where $B^+$ and $B^-$ are the fuzzy sets that describe the choke setting in $R^+$ and $R^-$, i.e., the descriptive rules by whose comparing, the weighted decision rule was constructed, and $w(R^-, R^+)$ is the weight of the decision rule.

Figure 10:
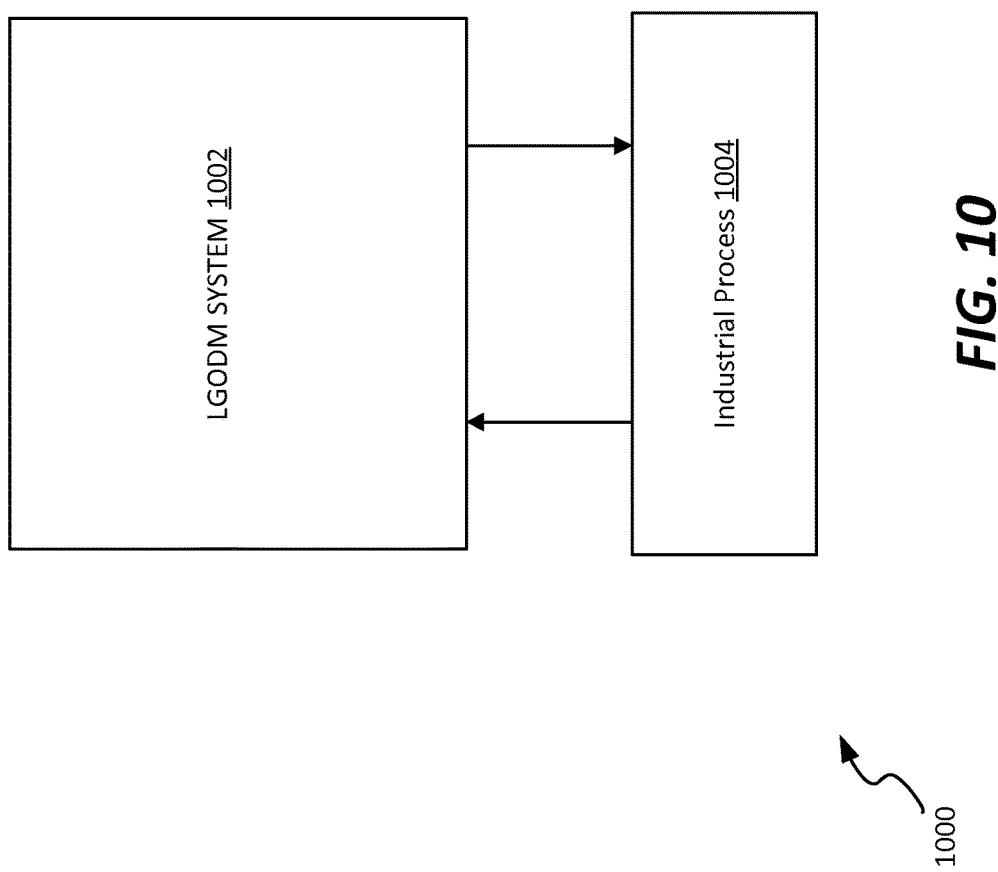
FIG. 10 is a schematic block diagram illustrating an alternative system in which the linguistic goal oriented decision-making system may operate, according to example aspects of the present disclosure.

Now referring to FIG. 10, a schematic block diagram illustrating the LGODM system 1002 used in an environment 1000 is shown. The input to the LGODM system 1002 comprises historical data used in the generation of descriptive rules that model a process 1004. In this embodiment, the LGODM system 1002 is applied to a process 1004 such as a steam injection distribution system, or other systems as described, below. In such an alternative embodiment, the LGODM system 1002 is used to optimize steam injection in a distribution system where the historical data inputs to the LGODM system 1002 are, for example, steam pressure and temperature.

In yet another alternative embodiment, the LGODM system 1002 is applied to a process 1004 such as drilling optimization. In such an embodiment, the LGODM system 1002 is used to determine the optimal drilling rate of penetration in which the historical data inputs to the LGODM system 1002 are, for example, quality of rock, temperature, and drill bit size.

In an alternative embodiment, the LGODM system 1002 is applied to a process 1004 such as acid stimulation optimization. Historical data, such as, for example, acid volume, concentration, and well completion, can be used by the LGODM system 1002 to design the optimum acid job treatment.

In an alternative embodiment, the LGODM system 1002 is applied to a process 1004 such as fracking in order to optimize the stimulation treatment design, where the historical data inputs to the LGODM system 1002 are, for example, pad volume, slurry volume, proppant, pumping rate, along with formation properties such as stress profiles and permeability.

Referring to FIGS. 1-10 generally, it is recognized that the LGODM systems described herein can be applied to a variety of different processes, and represent a solution by which uncertain, natural language expressions or goals can be achieved by way of applying fuzzy data set analyses to input and output variables, thereby defining descriptive rules and decision rules based on those descriptive rules and their associated consequents, that allows for improvements in automated decision making or feedback to large-scale processes, such as industrial processes, biological processes, or other types of processes (economic, social, financial). Still other advantages are apparent from the present disclosure, and are reflected in the claims set forth herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of attaining a linguistic goal output of a process using a linguistic goal oriented decision making system, the method comprising:
setting a linguistic goal for an output value from among a plurality of linguistic goals;
grouping a set of descriptive rules into at least one subset of descriptive rules, wherein each descriptive rule is established using historical data, each descriptive rule having at least one decision variable, and at least one linguistic output value, the decision variable representing an input to the process, according to the linguistic output value of each descriptive rule;

establishing one or more decision rules based on the grouped subsets of descriptive rules, the one or more decision rules describing a modification of a decision variable associated with at least one of the descriptive rules to affect the process; and modifying the decision variable based on the one or more decision rules thereby changing the input to the process to arrive at the linguistic goal, wherein the method is executed by a computer.

2. The method of claim 1, wherein establishing one or more decision rules comprises:

grouping at least one set of consecutive, intermediate goals together, wherein the set of consecutive, intermediate goals comprises a primary goal and a target goal;

establishing pairs of descriptive rules, the pairs of descriptive rules each comprising a first descriptive rule and a second descriptive rule, wherein the first descriptive rule has a primary goal in its consequent and the second descriptive rule has a target goal in its consequent; and comparing each of the pairs of descriptive rules to establish pairs of decision rules, the pairs of decision rules each comprising a first decision rule and a second decision rule, wherein the pairs of decision rules define a modification of the decision variable of the first descriptive rule based on a comparison to the second descriptive rule.

3. The method of claim 2, further comprising calculating a weight for each of the pairs of decision rules.

4. The method of claim 2, wherein comparing the first descriptive rule to the second descriptive rule further comprises:

computing a difference between a first decision variable associated with the first descriptive rule with a second decision variable associated with the second descriptive rule.

5. The method of claim 1, wherein the historical data is a combination of real data and expert data.

6. The method of claim 1, wherein the plurality of linguistic goals includes low, medium, and high or equivalently named operational states.

7. The method of claim 1, wherein the process is selected from among a group of processes comprising:

a steamflood wellhead system;
a waterflood wellhead system;
a steam injection distribution system;
an acid stimulation system;
a drilling prediction system;
a financial system;
an economic system;
a pharmacological system;
a medical system;
a biological system; and
a social system.

8. The method of claim 1, further comprising a pruning process, the pruning process comprising:

establishing at least one group, wherein each group comprises one or more decision rules having identical one or more antecedents and one or more consequents, wherein each decision rule has an associated weight; and for each established group, retaining a decision rule having a highest weight.

9. The method of claim 8, further comprising modifying the one or more consequents of each of the retained rules, wherein modifying comprises taking a triangular norm between membership functions and the associated weight of the retained decision rule.

10. A decision-making system comprising:

a computing device including a processor and a memory communicatively coupled to the processor, wherein the computing device is communicatively connected to one or more data streams associated with a process and at least one input to the process; and a descriptive rules engine stored in the memory, the descriptive rules engine including one or more descriptive rules;

wherein the memory stores instructions executable by the processor to perform a method of attaining a linguistic goal output of the process, the method including:

changing the numerical value of input data into fuzzy sets;

generating one or more descriptive rules with a historical data set defining historical data for a set of variables associated with the process;

aggregating decision rules to produce a decision set representing actions to take place on a decision variable based on a comparison of one or more descriptive rules defining the process, the descriptive rules each including at least a decision variable and a linguistic output value;

converting the one or more fuzzy sets to corresponding numerical output values; and adjusting the at least one input to the process based on a numerical output value.

11. The decision-making system of claim 10, wherein the process comprises a steamflood system or wellflood system, and wherein an adjustment engine adjusts a choke setting of an input to the process.

12. The decision-making system of claim 11, wherein the choke setting is adjusted to achieve a linguistic goal of the process.

13. The decision-making system of claim 10, wherein the instructions further cause the computing system to perform establishing membership functions for the historical data and establishing descriptive rules using the membership functions as well as historical data.

14. A non-transitory computer-readable storage medium comprising computer-executable instructions which, when executed by a computing system, cause the computing system to perform a method of attaining a linguistic goal output of a hydrocarbon well control process using a linguistic goal oriented decision making system, the method comprising:

setting at least one linguistic goal for at least one output value from among a plurality of linguistic goals;

establishing a set of descriptive rules using historical data, each descriptive rule having at least one decision variable, and a linguistic output value, the decision variable representing an input to the hydrocarbon well control process;

grouping the set of descriptive rules into at least one subset of descriptive rules according to the linguistic output value of each descriptive rule;

establishing one or more decision rules based on the grouped subsets of descriptive rules, the one or more decision rules describing a modification of a decision variable associated with at least one of the descriptive rules to affect the hydrocarbon well control process; and adjusting at least one physical input to the hydrocarbon well control process based on the one or more decision rules to arrive at the linguistic goal.

15. The computer-readable storage medium of claim 14, wherein establishing one or more decision rules comprises:

grouping at least one set of consecutive, intermediate goals together, wherein the set of consecutive, intermediate goals comprises a primary goal and a target goal;

establishing pairs of descriptive rules, the pairs of descriptive rules each comprising a first descriptive rule and a second descriptive rule, wherein the first descriptive rule has a primary goal in its consequent and the second descriptive rule has a target goal in its consequent; and comparing each of the pairs of descriptive rules to establish pairs of decision rules, the pairs of decision rules each comprising a first decision rule and a second decision rule, wherein the pairs of decision rules define a modification of the decision variable of the first descriptive rule based on a comparison to the second descriptive rule.

16. The computer-readable storage medium of claim 15, further comprising calculating a weight for each of the pairs of decision rules.

17. The computer-readable storage medium of claim 15, wherein comparing the first descriptive rule to the second descriptive rule further comprises:

computing a difference between a first decision variable associated with the first descriptive rule with a second decision variable associated with the second descriptive rule.

18. The computer-readable storage medium of claim 15, wherein the hydrocarbon well control process is selected from among a group of processes comprising:

a steamflood process;
a waterflood process;
a steam injection distribution process;
an acid stimulation process; and
a drilling prediction process.

* * * * *